United States Patent [19]

Brannan et al.

[11] Patent Number: 4,978,431

[45] Date of Patent: Dec. 18, 1990

[54] CONTINUOUS ELECTROPLATING OF CONDUCTIVE FOAMS

[75] Inventors: James R. Brannan, Perry; Andrew S. Bean, Willoughby; Anthony J. Vaccaro, Mentor; James J. Stewart, Chardon, all of Ohio

[73] Assignee: ELTECH Systems Corporation, Boca Raton, Fla.

[21] Appl. No.: 390,033

[22] Filed: Aug. 7, 1989

[51] Int. Cl.[5] .............................................. C25D 7/06
[52] U.S. Cl. ..................................................... 204/28
[58] Field of Search ......................................... 204/28

[56] References Cited

U.S. PATENT DOCUMENTS

| | | | |
|---|---|---|---|
| 1,243,654 | 10/1917 | Clark | 204/24 |
| 3,549,505 | 12/1970 | Hanusa | 204/11 |
| 3,694,325 | 9/1972 | Katz et al. | 204/11 |
| 4,077,853 | 3/1978 | Coll-Palagos | 204/20 |
| 4,251,603 | 2/1981 | Matsumoto et al. | 429/94 |
| 4,326,931 | 4/1982 | Kamijo et al. | 204/22 |
| 4,436,601 | 3/1984 | Branchick et al. | 204/149 |
| 4,687,553 | 8/1987 | Solomon et al. | 204/16 |

FOREIGN PATENT DOCUMENTS

0071119 9/1983 European Pat. Off. .
0151064 7/1985 European Pat. Off. .

Primary Examiner—T. M. Tufariello
Attorney, Agent, or Firm—John J. Freer

[57] ABSTRACT

The present invention resides in the discovery that a strip of reticulated foam which is semi-conductive can be continuously electroplated, utilizing a cathode roll which is positioned, in a first electroplating zone, outside of the electroplating bath. An anode is immersed in the electroplating bath. The strip of reticulated foam is first introduced into the electroplating bath and travels in the direction from the anode to the cathode roll prior to contacting the cathode roll. In this way, the strip achieves a partial plate at the anode which provides a current path between the anode and the cathode roll effective for sustaining the plating reaction in said first electroplating zone.

16 Claims, 4 Drawing Sheets

CONTINUOUS ELECTROPLATING OF CONDUCTIVE FOAMS

BACKGROUND OF THE INVENTION

The present invention relates to a process and apparatus for continuously electroplating metal onto a strip of conductive reticulated foam. The present invention is particularly advantageous for continuously electroplating metal onto a strip of conductive reticulated polymeric foam.

DESCRIPTION OF THE PRIOR ART

Prior U.S. Pat. No. 4,326,931 discloses a continuous process for treating a non-conductive porous tape. The process involves first making the porous tape electrically conductive. This can be carried out by electroless plating, coating with an electrically conductive paint, or vacuum deposition of metal onto the tape. The electrically conductive tape is then passed continuously through an electrolytic bath around a rotary drum which functions as a cathode. The rotary drum cathode is partly immersed in the bath. An anode is immersed in the bath spaced from the cathode. A voltage applied between the rotary drum cathode and the anode causes the deposition of metal from the electrolytic bath onto the tape. Second and third plating steps are then carried out by passing the tape linearly through second and third electrolytic baths. It is indicated in the patent that the deposition of metal onto the rotary drum cathode is minimized by passing the porous tape in close contact with the drum cathode so that the drum cathode is not directly exposed to the electrolyte. Details concerning the type of porous tape are not disclosed in the patent. It has been the experience of the applicants herein that when a porous (e.g. foam) substrate which has an open cellular structure is electroplated using a cathode roll which is immersed in the electroplating bath, plating of the cathode roll takes place through the open cells of the substrate. This plating peels off onto the substrate creating surface roughness on the substrate. Plate that is left on the cathode roll can snag the substrate and damage the substrate.

The patent also indicates that continuous plating of a cathode in tape form, using feeding rolls outside of the bath to supply current, is known. However, it is also stated that such a known method is effective for metal tapes having a very small specific resistance, and is not effective for plating a porous tape which has a specific resistance $10^2$ to $10^5$ times that of metal tapes.

Prior U.S. Pat. No. 1,243,654 discloses an example of a continuous process and apparatus for plating a metal onto a metal wire mesh or net. This patent contains no suggestion concerning continuous plating onto a non-metallic material.

Prior U.S. Pat. No. 3,549,505 discloses a process which is partially continuous, for metallizing cellular polyurethane. The process comprises rupturing the polyurethane cells and coating the polyurethane, by spray drying, with finely divided graphite or iron to make the polyurethane electrically conductive. These first two steps are carried out on a continuous basis. The reticulated, conductive polyurethane foam is then metallized in an electroplating cell. This step is carried out on a batch basis by immersing a desired length of the graphite or iron coated reticular product in the metallizing bath. The coated reticular product is placed between cathode and anode plates which are also immersed in the bath. The conductive, reticular product is in contact with the cathode plate. Metal ions are attracted to and deposited onto the negatively charged reticular polyurethane. There is no disclosure concerning metallizing the reticular polyurethane on a continuous basis.

Prior U.S. Pat. No. 3,694,325 discloses a batch process for electrolessly depositing metal onto a polyurethane foam, followed by plating the thus treated foam in a nickel-plating bath. There is no disclosure concerning plating the polyurethane foam in a continuous process.

Prior U.S. Pat. No. 4,077,853 discloses metallizing materials by coating a substrate, for instance, polyurethane foam, with a hydrophilic material, chemically plating the hydrophilic substrate with a metal to render the surface conductive, and electroplating a metal onto the conductive surface. The metallized foam can be annealed so that it can be compressed or otherwise formed. The process is not continuous.

Prior U.S. Pat. No. 4,251,603 discloses coating a foamed resin with carbon black and then plating the coated resin on both sides in a Watt solution. The resin is removed by pyrolysis and the resulting structure is annealed. It is suggested in the patent that the plating can be carried out continuously by pulling the resin sponge in a longitudinal direction while being plated. However, no details on how to do this are given.

Prior U.S. Pat. No. 4,687,553 discloses coating a plastic, open-celled foam with a conductive substance, such as carbon, followed by electroplating the coated foam. The foam can be subjected to pyrolysis for removing plastic material, followed by heat treatment. The process is non-continuous. This patent is assigned to the assignee of the present application.

Prior U.S. Pat. No. 4,436,601, in Examples 1 and 2 of the patent, discloses electrolessly metallizing polyurethane foam and then electrolytically coating the metallized foam with copper or nickel by immersing the metallized foam in an electrolytic bath. The plating is non-continuous.

A similar disclosure, similar to that of the '601 patent, is contained in European Patent Application No. 0071119. The disclosure in this patent is directed to the preparation of nickel-plated organic polymer foam reticulate electrodes. The plating step is not continuous.

Prior European Patent Application No. 0151064 also discloses a batch process in which a piece of polyurethane foam is first metallized by cathode atomization and then dipped into an electrochemical nickel-plating Watt bath.

SUMMARY OF THE INVENTION

The present invention resides in a process and apparatus for continuously electroplating a strip of conductive reticulated foam. An electroplating bath is provided. A first cathode roll is positioned outside of the electroplating bath. A first anode is immersed in the electroplating bath, the first cathode roll and first anode defining a first plating zone. The strip of reticulated foam is introduced into the electroplating bath and is guided so that it travels past said first anode prior to contacting said first cathode roll. In this way, the strip achieves a partial plate at the first anode which provides a current path between the first anode and the first cathode roll effective for sustaining the plating reaction in said first electroplating zone.

By positioning the cathode roll outside of the electroplating bath, the cathode roll does not plate with metal. This eliminates surface roughness in the plated strip of reticulated foam and prevents damage to the strip from snagging on the cathode roll. It also eliminates downtime required to clean the cathode roll and increases the efficiency of the electroplating process.

In an embodiment of the present invention, for reticulated foam which has initially, prior to plating, a very low conductivity, the plating in the first electroplating zone can be initiated by attaching to the leading edge of the strip of foam a high conductive leader which bridges the gap between the immersed anode and the cathode roll. This leader provides a temporary current path from the cathode roll to the anode until the gap is bridged by partially plated foam advanced in the direction of the cathode roll. Preferably, the immersed anode is positioned close to the surface of the electroplating bath and near the non-immersed cathode roll to minimize the gap between the anode and cathode roll.

In the first electroplating zone, the reticulated foam is sufficiently plated so that it can be further electroplated in subsequent zones using conventional plating procedures if desired. In one embodiment of the present invention, the strip of partially plated reticulated foam is passed directly from the first electroplating zone to successive electroplating zones using the same electroplating bath for all of the plating zones.

Alternatively, the strip of partially plated reticulated foam can be taken-up on an accumulator roll after the first electroplating zone, or at some other intermediate position in the electroplating process, and then passed to successive electroplating zones from the accumulator roll. The advantage of this alternative procedure is that the speed of travel of the reticulated foam can be optimized at a relatively slow rate in the first or initial electroplating zones and separately optimized at a relatively higher rate in successive electroplating zones, increasing the plating efficiency in the successive electroplating zones.

In either embodiment, whether the electroplating is carried out in a single electroplating bath, or two or more electroplating baths, each of the electroplating zones preferably comprises a non-immersed cathode roll and an immersed idler roll. An anode is positioned in each electroplating zone between the cathode roll and the idler roll, at the surface of the electroplating bath. The reticulated foam passes in an undulating fashion into and out of the electroplating bath. In passing from each idler roll to a cathode roll, or vice versa, the strip of reticulated foam passes across the face of the zone anode. In the subsequent plating zones, the foam is more conductive and can be plated with either a lower voltage or higher current density than in the first zone.

The present invention is particularly advantageous for electroplating reticulated polymer foams, such as reticulated polyurethane foams. If desired, the electroplated polymer foam can be annealed so that it can be formed or shaped without cracking the metallized structure, using known annealing procedures. Optionally, the electroplated reticulated polymer foam can be pyrolyzed so as to remove polymer from the metallized structure prior to annealing.

It will become apparent that the metallized reticulated foam product of the present invention has a number of applications. A principal application is as a substrate for a battery current collector, for instance a current collector for a nickel-cadmium battery. Other applications are as the substrate for a heat exchanger; a catalyst support; the substrate for an electrode; and the substrate for a regenerator. An example of a cathode in which the product of the present invention might be used is a cathode for an electrochemical process, for instance an electro-synthesis process for waste disposal or a heavy metal recovery process.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
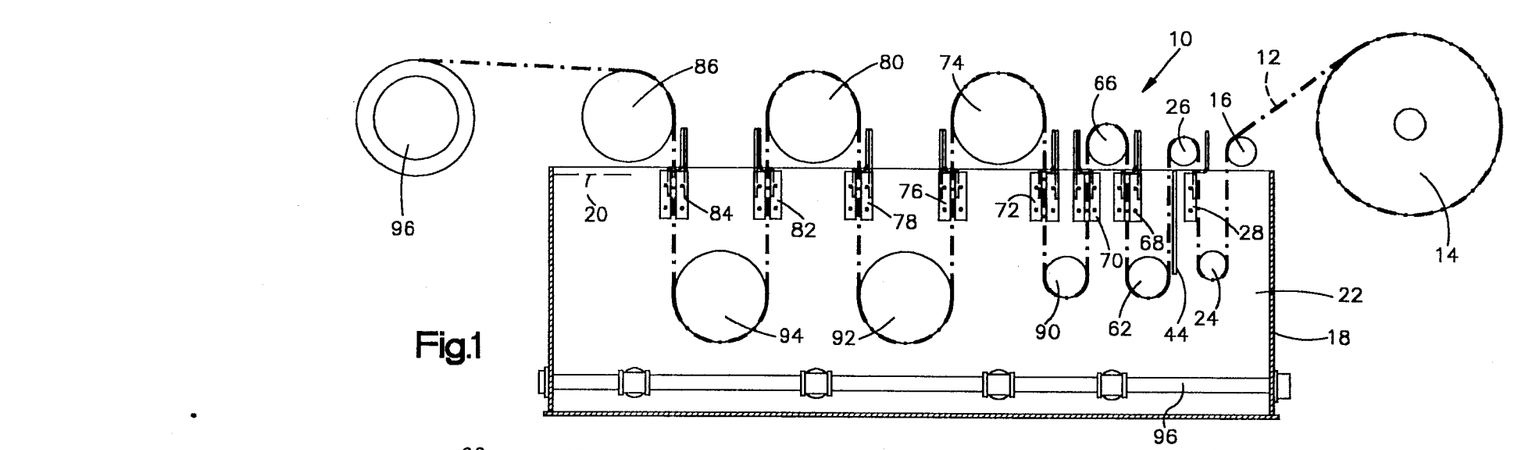
FIG. 1 is an elevation, partial section, schematic view of the continuous plating apparatus of the present invention.
Figure 2:
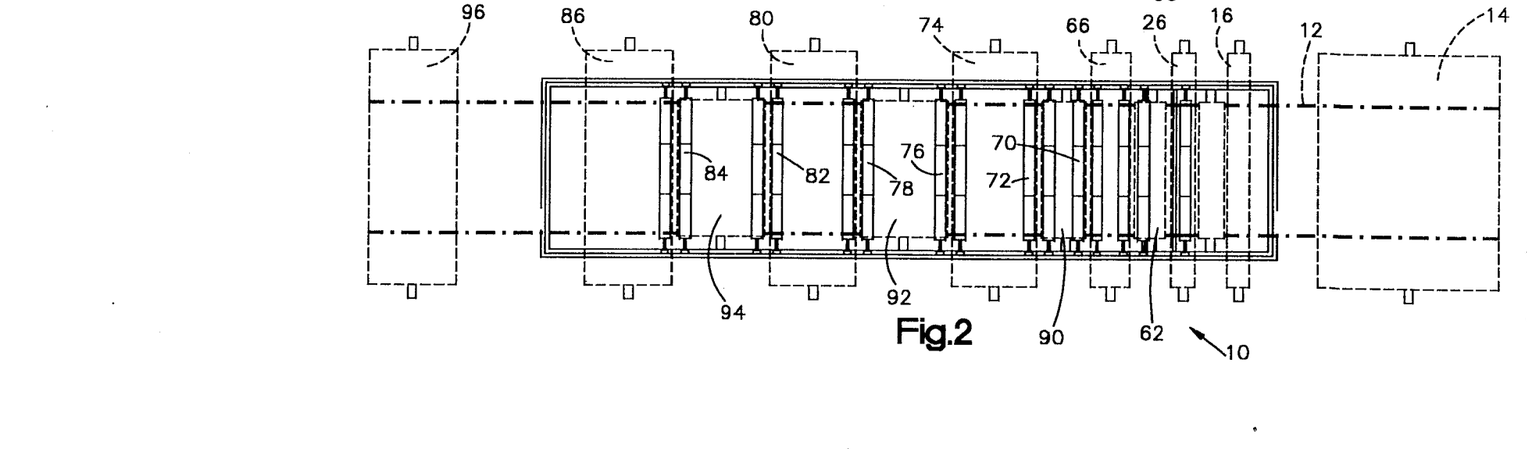
FIG. 2 is a schematic, plan view of the apparatus of FIG. 1.

FIGS. 1 and 2 disclose a continuous plating apparatus 10 for plating a conductive reticulated foam in accordance with the present invention. In the figures, the apparatus of the present invention is shown generally in solid lines. Light dashed lines in the plan views are used to show various rolls of the apparatus and to distinguish the rolls from the rest of the apparatus. A strip 12 of conductive reticulated foam is shown in heavy dashed lines to show the path of travel of the strip. Referring to FIGS. 1 and 2, the strip 12 of conductive reticulated foam is fed from a supply roll 14. The strip 12 of reticulated foam should be relatively flexible and capable of making a U-bend around a small diameter roll.

The strip 12 of conductive reticulated foam can comprise any of a variety of substrate materials having low conductivity. Included are polymeric foams, carbon or graphite foams, silicate foams, aluminum foam and other organic or inorganic open-cellular materials. Synthetic or natural fibers, flexible paper or wood products, and leather can also be successfully electroplated with a metal in the process and apparatus of the present invention. Preferably, the substrate material is one which has open interconnected cells. For purposes of the present application, the term "reticulated foam" shall include all such substrate materials.

Useful reticulated polymeric foams which can be employed are any of those polymeric substrates which are conventionally used for preparing polymer foams electroplated with a metal; such as polyurethanes, including a polyether urethane foam or a polyester urethane foam; polyesters; olefin polymers, such as polypropylene or polyethylene; vinyl and styrene polymers, and polyamides. Examples of commercially available organic polymer substrates include polyurethane foams marketed by Scotfoam Corporation, such as Scot Industrial Foam, Q-version; Scot Industrial Foam PVC coated, and "Scotfelt" (trademark) foam; polyether urethane foams, and polyester urethane foams. These foam substrates may have an average number of pores per inch within a wide range, typically within a range of about 5 to about 100 pores per inch (ppi.). The average number of pores per inch is dictated by application. For instance, for an electrode substrate for a nickel-cadmium battery, it may be desirable to utilize a polymer foam having from about 40 to about 100 pores per inch. For a substrate for an engine head, it may be desirable to employ a polymer foam having from about 7 to about 45 pores per inch.

In the practice of the present invention, the strip 12 of reticulated foam must have some electrical conductivity as a prerequisite for electroplating. For purposes of the present application, the term "conductive reticulated foam" shall mean a reticulated foam having partial conductivity, or one which can be designated as "semi-conductive", following conventional practice in the industry. A reticulated foam can be made "conductive" employing any of a number of well known procedures such as coating with a latex graphite; electroless plating with a metal such as copper or nickel; coating with an electrically conductive paint containing carbon powder, or a metal powder such as silver powder or copper powder; and vacuum deposition of a metal. One suitable electroless nickel plating process is disclosed in the aforementioned EPO published application No. 0071119, mentioned above. The disclosure of this published application is incorporated by reference herein. Polyurethane foams coated with a latex graphite which are commercially available are those marketed under the trademark "Conductive Foams" by Scotfoam Corporation. These foams typically have a conductivity of about $0.015 \times 1/[\text{ohms.centimeters}]$.

Referring again to FIGS. 1 and 2, the strip 12 of conductive reticulated foam is fed around a feed roll 16 into an electroplating tank 18. The tank 18 is maintained to a level 20 with a standard electroplating bath 22. The feed roll 16 is made of a material such as plastic which is inert to the electrolyte of bath 22. The electroplating bath 22 in the present invention can be any of a number of conventional electroplating baths capable of electroplating a variety of metals. Such metals include, by way of example, nickel, chromium, zinc, copper, tin, lead, iron, gold, silver, platinum, palladium, rhodium, aluminum, cadmium, cobalt, indium, mercury, vanadium, thalium, and gallium. Alloys can be plated in accordance with the present invention, such as brass, bronze, cobalt-nickel alloys, copper-zinc alloys and others. Some metals are not susceptible to electrodeposition from an aqueous medium and require special plating baths. For example, aluminum and germanium are most commonly electrodeposited from an organic bath or a medium of fused salt. All of such known electroplating baths are conventional in the art and can be used in the practice of the present invention.

One suitable bath successfully employed in the practice of the present invention is a nickel-sulfamate bath having the following composition, pH, and temperature:

| Nickel sulfamate | 60 oz/gal. |
|---|---|
| Boric acid | 4.0 oz/gal. |
| Anti-pitting agent | 0.05 oz/gal. |
| pH | 3–5 |
| Temperature | 100°–180° F. |

The strip 12 of conductive reticulated foam is directed into the bath 22 downward and makes a reverse turn around a lower immersed idler roll 24. The idler roll 24 is made of a dielectric, e.g. plastic, material inert to the electroplate bath. Suitable plastic materials are nylon, polyvinyl chloride and polypropylene. The strip 12 then travels upward from the idler roll 24 to a first metal cathode roll 26, made conductive by means of a conventional slip ring (not shown). Both the immersed idler roll 24 and the cathode roll 26 have a small diameter. In accordance with the present invention, the cathode roll 26 is positioned outside of the electroplate bath 22. By way of example, it may be spaced about ½ inch from the surface 20 of the bath.

Between the idler roll 24 and the cathode roll 26, the strip 12 of conductive reticulated foam makes a first plating pass across the face of an anode 28. Thus, the cathode roll 26 and the anode 28 together define a first electroplating zone 30, FIG. 3, in the apparatus of the present invention.

Figure 7:
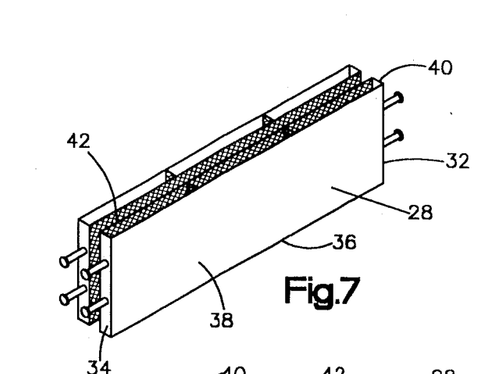
FIG. 7 is a perspective view of a pair of anode baskets in the apparatus of FIG. 1.
Figure 8:
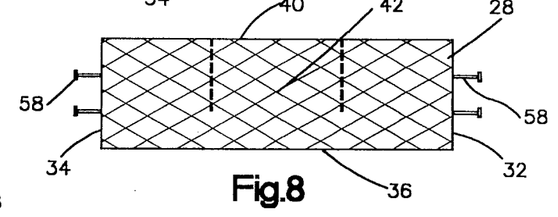
FIG. 8 is an elevation front view of a single anode basket of the pair of anode baskets of FIG. 7.
Figure 9:
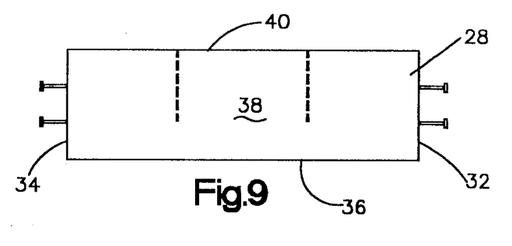
FIG. 9 is an elevation rear view of a single anode basket of the pair of anode baskets of FIG. 7.

In the process of the present invention, the anode can be consumable or non-consumable. In the specific embodiment illustrated in the drawings, with a nickel sulfamate bath given above, the basket is non-consumable, but is adapted to contain a consumable component. FIGS. 7, 8, and 9 show details of an anode 28. A pair of anodes 28 are shown in FIG. 7. When a pair of anodes 28 are used, the strip 12 of conductive reticulated foam is passed between the anodes. Thus, the strip 12 is plated on both sides. In the embodiment of FIG. 1, only a single anode 28 is used in the first plating zone. This limits the plating in the first zone to one side only of the strip 12. Alternatively, if desired, the plating in the first zone can be onto both sides of the strip 12 using a pair of anodes 28 as shown in FIG. 7.

Referring to FIGS. 8 and 9, the anode 28 is an essentially rectangular member which, for use in the specific bath mentioned above, is a basket made of titanium or other valve metal so that it is resistant to corrosion in the electroplating bath. Examples of other valve metals are tantalum, zirconium, niobium, tungsten, and alloys thereof wherein the alloy consists predominantly of at least one of the valve metals. The basket comprises closed ends 32 and 34, a closed bottom 36, a rear face 38 which is closed, an open top 40, and a perforate front 42, e.g., a mesh screen front. The size of the basket of anode 28 is optimized for a given application. The width of the basket is about the same as the width of the strip 12 of reticulated foam being plated. The depth of the basket is dictated by the current density desired. In the embodiment of FIG. 1, the basket of anode 28 was about fifteen inches by six inches by one and one-half inches in width.

Figure 6:
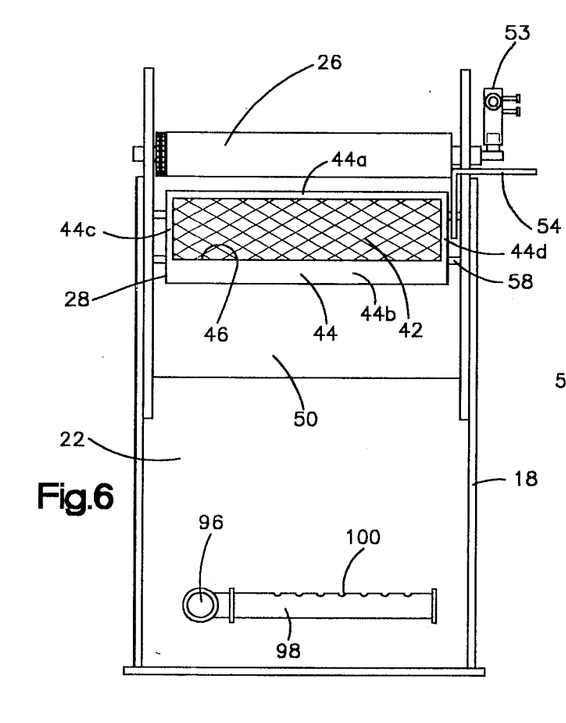
FIG. 6 is a schematic, elevation, section view of the apparatus of FIG. 3 showing the anode and cathode of the first electroplating zone.

Referring to FIG. 6, the basket of anode 28 has a rectangular mask 44 around the periphery of the open perforate front 42. The mask 44 comprises top and bottom portions 44a, 44b, and side portions 44c, 44d which define a window 46 of about three inches by fourteen inches in size. The anode 28 is positioned to that the strip 12 of conductive reticulated foam passes across the perforate front 42. The mask 44 functions as a spacer between the strip 12 of conductive reticulated foam and the anode 28. The thickness of the mask 44 is sufficient to prevent contact of the strip 12 with the anode 28, e.g., about one-eighth inch. The mask 44 is preferably of a dielectric material which is resistant to the electroplating bath 22, and which provides a relatively friction free surface for the strip 12, such as "Teflon" (a registered trademark).

Figure 3:
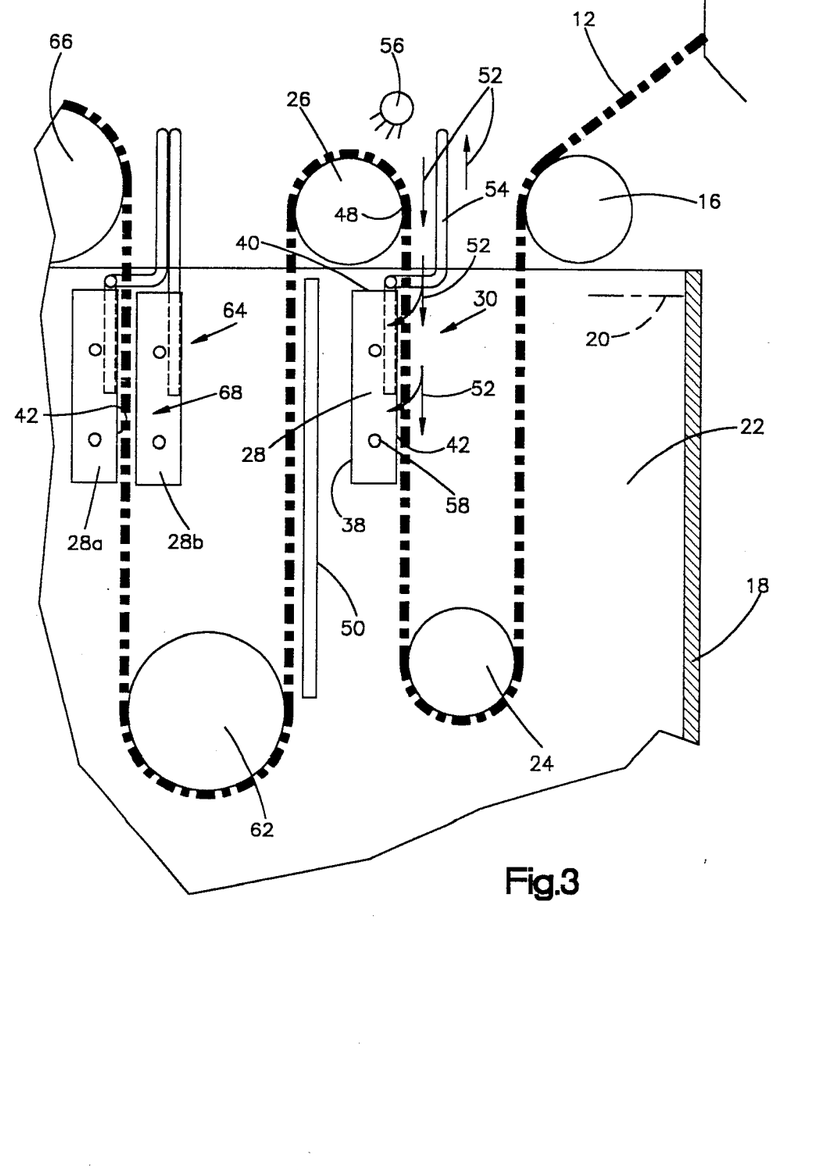
FIG. 3 is an enlarged elevation, partial section schematic view of a portion of the apparatus of FIG. 1 showing details of the first electroplating zone of the apparatus with only one anode shown.

The basket of anode 28, for use with the above-described bath, is filled with consumable nickel chips (not shown). Referring to FIG. 3, the anode 28 is positioned so that the open top 40 is close to the level 20 of the electroplating bath 22. The cathode roll 26 is positioned with respect to the anode 28 and the idler roll 24 so that the strip 12 of conductive reticulated foam makes an upward pass across the face of the anode 28 against the mask 44 to a line of contact 48 of the strip 12 with the cathode roll 26.

A dielectric, imperforate separator 50 (FIGS. 3 and 4), of a plastic material inert to the electroplating bath 22, such as polyvinyl chloride, nylon, polyethylene, polypropylene and Teflon, is positioned on the backside of the anode basket 28. The separator 50 extends from above the level 20 of the bath 22 to a position about on the level with the bottom of the idler roll 24, well below the anode 28. The purpose of the separator 50 is to control the current distribution in the first zone 30 by reducing stray currents from the first anode 28 to later plating stages. Separators could also be employed in said later stages to control current distribution in the electroplating bath, if desired.

This current flow in the first electroplating zone 30 is shown in FIG. 3 by arrows 52. Current is supplied to the cathode roll 26 by means of cathode leads 53, shown in FIG. 6. The current flow to the cathode roll 26 is through a conventional internal slip ring (not shown). The current flow from the cathode roll 26 is from the line of contact 48 of the strip 12 with the cathode roll 26 and through the strip 12 to the anode basket 28. The current flow from the anode 28 is then through anode leads 54 back to a current source (not shown). Current flow to the anode 28 causes the deposition of metal from conventional anode metal chips (not shown) which are contained in the basket of anode 28 onto the strip 12.

In the practice of the present invention, the reticulated foam, even though termed "conductive" is a relatively poor conductor of electricity. Even a graphite coated polymeric material is a relatively poor conductor of electricity. However, by passing the strip 12 of reticulated foam in the direction from the anode basket 28 to the cathode roll 26, there is sufficient deposition of metal from the anode 28 onto the strip 12 to make plating in the first plating zone 30 self-sustaining. In addition, the deposition of metal on the strip 12 in the first plating zone is sufficient for the application of additional metal in subsequent plating zones effective to achieve a uniformly plated substrate of whatever thickness plating is desired.

At the first cathode roll 26, the voltage across the cathode roll 26 and the anode 28 is a function of such factors as the line speed desired and the plate thickness desired. An effective voltage is one that may be higher than the voltage used in later stages of the electroplating process. This can cause a heat build-up in the strip 12 in the gap between the cathode roll 26 and the anode 28, which could cause burning of the foam substrate. It was found that this heat build-up can be controlled by cooling the strip 12, for instance by spraying cold liquid such as water onto the strip 12 from spray 56. Only a fine spray is needed to prevent damage to the strip 12. The amount of liquid applied should be an effective amount for cooling the strip. The strip 12 can also be cooled by an air jet, or by cooling the cathode roll 26, or by other means apparent to those skilled in the art.

Support rods 58, FIG. 6, attached to the ends 32, 34 of the basket support the basket of anode 28 in the electroplating bath 22. These support rods 58 are of the same material as the basket. The tank 18 is made of a non-conductive material.

Figure 4:
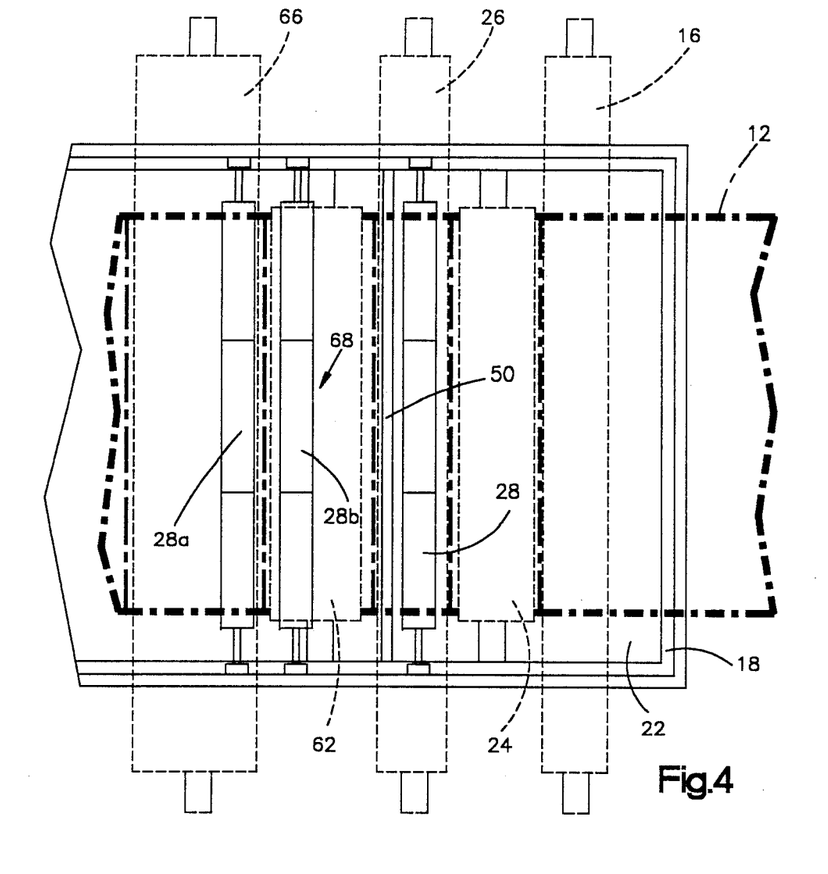
FIG. 4 is an enlarged, schematic plan view of the apparatus of FIG. 3.

The partially plated strip 12 of reticulated foam makes a reverse turn around the cathode roll 26 and is directed downward back into the bath 22 around a second immersed idler roll 62 (FIG. 3). The strip 12 makes a reverse turn around the idler roll 62 and then a pass in a second electroplating zone 64 defined by a second cathode roll 66 and a second anode 68 (FIGS. 3 and 4). The second anode 68 can comprise a pair of anode baskets 28a and 28b positioned on opposite sides of the strip 12 of reticulated foam. Each of the baskets 28a and 28b is the same as the basket 28 shown in FIGS. 8 and 9. The baskets 28a, 28b are positioned so that the open mesh fronts 42 face each other and face the strip 12 of reticulated foam, the foam passing between the baskets 28a and 28b. In this way, the strip 12 can be plated on both sides.

In the embodiment illustrated in FIGS. 3 and 4, the idler roll 62 and cathode roll 66 both have a larger diameter than that of the first zone rolls 24 and 26. The purpose of this is to accommodate the stiffer more heavily plated foam. The particular diameter is optimized for each situation.

In the second electroplating zone, defined by anode 68 and cathode roll 66, the same procedure is used as used in the first plating zone, namely passing the strip from the anode 68 to the cathode roll 66. In this way, the strip 12 picks up additional metal at the anode 68 so that a lower voltage or higher current density can be employed in the second plating zone than in the first plating zone.

For the rest of the electroplating process, the plating can be both (i) onto opposite sides of the foam and (ii) in both the downward pass into the bath and upward pass out of the bath. As shown, the apparatus comprises six additional electroplating zones, defined as follows, referring to FIGS. 1 and 2:

| Zone | Defined By |
| --- | --- |
| 3 | Cathode roll 66 and anode 70 |
| 4 | Anode 72 and cathode roll 74 |
| 5 | Cathode roll 74 and anode 76 |
| 6 | Anode 78 and cathode roll 80 |
| 7 | Cathode roll 80 and anode 82 |
| 8 | Anode 84 and cathode roll 86 |

Each of the cathode rolls 74, 80, except the last cathode roll 86, can serve two electroplating zones, as can cathode roll 66. The last cathode roll 86 serves only one electroplating zone. Between the successive zones are idler rolls 90, 92 and 94. The cathode rolls 74, 80 and 86 and idler rolls 92, 94 are of still larger diameter than the other rolls in the apparatus, to accommodate bending of the reticulated foam which is yet stiffer from additional plating. From the last cathode roll 86, the now plated reticulated foam is taken up on take-up roller 96.

As an alternative to the above apparatus, an accumulator roll can be positioned at an intermediate point in the apparatus, for instance, after the cathode roll 66 (FIG. 3). The strip of partially plated reticulated foam can then be passed from the accumulator roll to the successive electroplating zones, which can be either in the same bath with the initial electroplating zones, or in a different bath. An advantage of this alternative procedure is that the speed of the reticulated foam in the initial electroplating zones can be optimized and in successive electroplating zones can be separately optimized.

Figure 5:
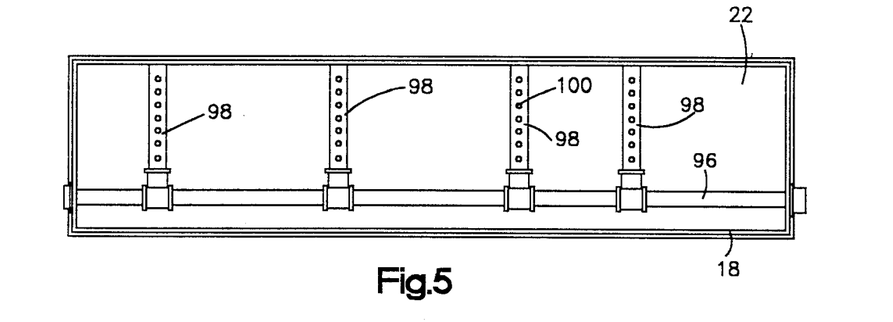
FIG. 5 is a plan, section view of the apparatus of FIG. 1 showing the electrolyte distribution system of the apparatus.

FIGS. 5 and 6 show the electrolyte distribution system in the continuous plating apparatus. In the embodiment shown, the composition of the bath is maintained substantially the same throughout tank 18. This is accomplished by use of a single manifold 96 which extends longitudinally within the tank and a plurality of laterals 98 which are spaced apart and extend laterally within the tank. Openings 100 in the top of the laterals allow the flow of electrolyte from a source (not shown) into the tank.

It may be desirable, in the first electroplating zone, to attach a metal leader, onto the leading edge of the strip of reticulated foam, prior to introducing the strip of reticulated foam into the zone. Such a leader would provide a path for the current flow in the first electroplating zone, between cathode roll 26 and anode 28, to initiate plating of the strip of reticulated foam sufficient to make further plating in the initial electroplating zone self-sustaining. Such a leader would be advantageously employed with a reticulated foam substrate which has very low conductivity or high resistivity.

For some applications, the plated reticulated foam can be used without further processing. However, for other applications, the plated structure is washed with water and the organic polymeric material is removed by pyrolysis. Typically, pyrolysis will be at a temperature in the range of about 500° C. to about 700° C. for up to about three (3) hours depending upon the polymer substrate used. This can then be followed by annealing using conventional annealing procedures. For instance, if the plate is nickel, annealing can take place in a hydrogen environment at about 800° C. to about 1200° C. for up to about thirty (30) minutes. The resulting product has a high porosity, for instance an average porosity of about 96%, and an open cellular structure.

Prior U.S. Pat. No. 4,687,553, assigned to the assignee of the present application, discloses a method for pyrolysis which is carried out in multiple steps to avoid disruption of the plating, and to remove surface oxides which may form in the pyrolysis treatment. The disclosure of U.S. Pat. No. 4,687,553 is incorporated by reference herein.

The present invention will be disclosed in additional detail in the following Examples. In these Examples, all parts, percentages and ratios are by weight unless otherwise indicated. All metal concentrations were determined using standard atomic absorption techniques.

EXAMPLE 1

This Example relates to the preparation of a nickel reticulated battery electrode for a nickel/cadmium battery. A polyurethane foam substrate which was made conductive with a graphite resin was electrolytically plated in the apparatus of FIG. 1. In this Example, only the first two cathode rolls 26 and 66 were used. The conductive polyurethane foam is commercially available from Scotfoam Corporation, marketed under the trademark "Conductive Foam". The conductive foam had the following characteristics:

| Characteristic | Value |
| --- | --- |
| Width of strip | 14 inches |
| Thickness of strip | 0.070 inches |
| Conductivity | 0.015 × 1/[ohms · centimeters] |
| Pores per inch | 80 |

Electroplating was carried out at a line speed of about two inches per minute. The following Table 1 gives currents and voltage drops in the two plating zones.

TABLE 1

| Zone | Current | Voltage |
| --- | --- | --- |
| 1 | 50 amps | 9–10 volts |
| 2 | 335 amps | 8–9 volts |

The electroplate bath was a nickel-sulfamate bath having the composition given above, and was maintained at a pH of about 3–5 and temperature of about 40° C. The nickel chips in baskets 28 were sulfur depolarized electrolytic grade nickel. The nickel plating was about 0.2 grams per cubic centimeter of foam substrate.

The plated foam was then subjected to pyrolytic treatment at a temperature of about 500° C. for about one hour in air.

The pyrolysis was followed by annealing in hydrogen at a temperature of about 1100° C. for ten (10) minutes. Annealing also removed surface oxides.

EXAMPLE 2

This Example also relates to the preparation of a nickel reticulated battery electrode for a nickel/cadmium battery. A polyurethane foam substrate which was made conductive with a graphite resin was electrolytically plated in the apparatus of FIG. 1 containing three cathode rolls 26, 66 and 74. Plating was carried out in four zones using anodes 28, 68, 70 and 72. The conductive polyurethane foam is commercially available from Scotfoam Corporation, marketed under the trademark "Conductive Foam". The conductive foam had the following characteristics:

| Characteristic | Value |
| --- | --- |
| Width of strip | 10 inches |
| Thickness of strip | 0.060 inches |
| Pores per inch | 80 |

Electroplating was carried out at a line speed of about three inches per minute. The following Table 2 gives currents and voltage drops in the four plating zones.

TABLE 2

| Zone | Current | Voltage |
| --- | --- | --- |
| 1 | 50 amps | 8–9 volts |
| 2 | 75 amps | 5–6 volts |
| 3 | 75 amps | 5–6 volts |
| 4 | 160 amps | 11–12 volts |

The electroplate bath was a nickel-sulfamate bath having the composition given above, and was maintained at a pH of about 3–5 and temperature of about 40° C. The nickel chips in baskets 28 were sulfur depolarized electrolytic grade nickel. The nickel plating was about 0.2 grams per cubic centimeter of foam substrate.

The plated foam was then subjected to pyrolytic treatment and annealing as in Example 1.

EXAMPLE 3

This Example also relates to the preparation of a nickel reticulated battery electrode for a nickel/cadmium battery. A polyurethane foam substrate which was made conductive with a graphite resin was electrolytically plated using an embodiment of the apparatus of FIG. 1. The polyurethane foam was partially plated in an apparatus containing only two cathode rolls 26 and 66 and then was wound on an accumulator roll. Subsequently it was unwound from the accumulator roll and introduced into a second plating tank containing two additional cathode rolls similar to rolls 74, 80. The second tank contained three anodes similar to anodes 72, 76 and 78 defining with the cathode rolls three additional plating zones. The conductive polyurethane foam is commercially available from Scotfoam Corporation, marketed under the trademark "Conductive Foam". The conductive foam had the following characteristics:

| Characteristic | Value |
| --- | --- |
| Width of strip | 10 inches |
| Thickness of strip | 0.060 inches |
| Pores per inch | 80 |

Electroplating was carried out at a line speed of about four inches per minute in the first tank and about one inch per minute in the second tank. The following Table 3 gives currents and voltage drops in the five plating zones.

TABLE 3

| Zone | Current | Voltage |
| --- | --- | --- |
| 1 | 54 amps | 15–16 volts |
| 2 | 150 amps | 9–10 volts |
| 3 | 88 amps | 8–9 volts |
| 4 | 88 amps | 8–9 volts |
| 5 | 88 amps | 8–9 volts |

The electroplate bath was a nickel-sulfamate bath having the composition given above, and was maintained at a pH of about 3–5 and temperature of about 40° C. The nickel chips in baskets 28 were sulfur depolarized electrolytic grade nickel. The nickel plating was about 0.35 grams per cubic centimeter of foam substrate.

The plated foam was then subjected to pyrolytic treatment and annealing as in Example 1.

EXAMPLE 4

This Example illustrates plating in the apparatus of FIG. 1 using all eight plating zones and a nickel-sulfamate bath. The conductive polyurethane foam substrate is the same as in Example 1. Electroplating can be carried out at a line speed of about five inches per minute, resulting in plating in the range of about 0.1 to about 0.3 grams per cubic centimeter. The following Table 4 gives currents and voltage drops in the eight plating zones.

TABLE 4

| Zone | Current | Voltage |
| --- | --- | --- |
| 1 | 125 amps | 17–18 volts |
| 2 | 150 amps | 10 volts |
| 3 | 150 amps | 7–8 volts |
| 4 | 175 amps | 7–8 volts |
| 5 | 175 amps | 7–8 volts |
| 6 | 200 amps | 7–8 volts |
| 7 | 200 amps | 7–8 volts |
| 8 | 175 amps | 7–8 volts |

From the above description of a preferred embodiment of the invention, those skilled in the art will perceive improvements, changes and modifications, such improvements, changes and modifications within the skill of the art are intended to be covered by the appended claims.

Having described a specific preferred embodiment of the invention, the following is claimed:

1. A process for continuously electroplating a strip of conductive reticulated foam which comprises the steps of:
   (a) providing an electroplating bath;
   (b) positioning a first cathode roll outside of said electroplating bath;
   (c) positioning a first anode within the electroplating bath, said first cathode roll and first anode defining a first plating zone; and
   (d) introducing said strip of conductive reticulated foam into said electroplating bath and guiding said strip so that it travels past said first anode prior to contacting said first cathode roll.

2. The process of claim 1 wherein said strip is a conductive reticulated polymer foam.

3. The process of claim 1 wherein said anode is positioned in the electroplating bath near the surface of the electroplating bath and said cathode roll is positioned above the surface of said bath and near said first anode, said strip travelling upwardly past said first anode onto said cathode roll.

4. The process of claim 3 including the steps of electroplating said foam in additional electroplating zones subsequent to said first plating zone.

5. The process of claim 4 wherein said additional zones are in the same electroplating bath containing said first electroplating zone, said first electroplating zone being electrically shielded from said subsequent electroplating zones.

6. The process of claim 4 including the steps of accumulating said strip of conductive reticulated foam at a point intermediate said first plating zone and at least some of said subsequent plating zones, and separately optimizing the speed of said strip before and after said intermediate point.

7. The process of claim 2 wherein said reticulated polymer foam is coated with a graphite latex whereby it is conductive.

8. The process of claim 2 including the step of passing said strip of conductive reticulated polymer foam around an idler roll immersed in the electroplating bath prior to passing said foam past said first anode.

9. The process of claim 2 wherein said electroplating bath is a nickel plating bath.

10. The process of claim 2 wherein said plated foam is annealed.

11. The process of claim 2 wherein said plated foam is subjected to pyrolysis and annealed.

12. A reticulated metal strip prepared by the process of any of claims 1, 2, 10, or 11.

13. A substrate for a battery current collector prepared by the process of claim 11.

14. A substrate for an electrochemical process cathode prepared by the process of claim 11.

15. A process for continuously electroplating a strip of conductive reticulated foam which comprises the steps of:
(a) providing an electroplating bath;
(b) positioning a first cathode roll outside of said electroplating bath;
(c) positioning a first anode within the electroplating bath, said first cathode roll and first anode defining a first plating zone;
(d) attaching to a leading edge of said strip of conductive reticulated foam a high conductive leader; and
(e) introducing said strip of conductive reticulated foam and leader into said electroplating bath and guiding said strip and leader so that they travel past said first anode prior to contacting said first cathode roll, the length of said leader being sufficient to bridge the gap between said anode and cathode roll at the start-up of said electroplating process.

16. The process of claim 15 wherein said strip is a conductive reticulated polymer foam, said leader being a metal leader.

* * * * *